(12) United States Patent
Starr et al.

(10) Patent No.: US 8,577,934 B2
(45) Date of Patent: Nov. 5, 2013

(54) SYSTEM AND METHOD FOR A STORAGE SYSTEM RESPONSE WITH DATA MIGRATION

(75) Inventors: Matthew Thomas Starr, Lafayette, CO (US); Joshua Daniel Carter, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 102 days.

(21) Appl. No.: 13/071,336

(22) Filed: Mar. 24, 2011

(65) Prior Publication Data

US 2012/0246201 A1 Sep. 27, 2012

(51) Int. Cl.
*G06F 17/30* (2006.01)

(52) U.S. Cl.
USPC ........... 707/809; 707/635; 707/647; 707/810; 707/812

(58) Field of Classification Search
USPC .................. 707/635–637, 647, 809, 810, 812
See application file for complete search history.

(56) References Cited

U.S. PATENT DOCUMENTS

| | | | |
|---|---|---|---|
| 6,643,671 B2 * | 11/2003 | Milillo et al. ................. | 707/622 |
| 7,730,071 B2 * | 6/2010 | Iwasaki et al. ................ | 707/742 |
| 8,069,324 B2 * | 11/2011 | Moon et al. ................... | 711/162 |
| 8,086,768 B2 * | 12/2011 | Watanabe et al. .............. | 710/38 |
| 8,364,645 B2 * | 1/2013 | Iwasaki et al. ................ | 707/652 |
| 2006/0010227 A1 * | 1/2006 | Atluri .......................... | 709/217 |
| 2008/0010325 A1 * | 1/2008 | Yamakawa .................... | 707/204 |
| 2010/0070474 A1 * | 3/2010 | Lad ............................. | 707/624 |
| 2010/0079223 A1 * | 4/2010 | Kuo et al. .................... | 333/24 R |
| 2011/0040729 A1 * | 2/2011 | Ito et al. ...................... | 707/654 |
| 2012/0066179 A1 * | 3/2012 | Saika .......................... | 707/634 |
| 2012/0109940 A1 * | 5/2012 | Ishii et al. .................... | 707/722 |
| 2012/0246271 A1 * | 9/2012 | Takata et al. ................. | 709/217 |

\* cited by examiner

*Primary Examiner* — Debbie Le
(74) *Attorney, Agent, or Firm* — Kenneth Altshuler

(57) ABSTRACT

Provided is a system and method for a storage system response. The system includes a first storage system adapted to be linked in communication with at least one client and with a second storage system, the second storage system retaining a plurality of digital assets. An asset map is adapted to track where in the first storage system or the second storage system each of the plurality of digital assets is retained. A migrator is also provided and structured and arranged to migrate each of the plurality of digital assets from the second storage system to the first storage system, the migrator further adapted to update the asset map regarding a status of migration for each of the plurality of digital assets. A server structured and arranged to fulfill digital asset requests received by the first storage system from the at least one client, the server structured and arranged to consult the asset map to determine where the requested digital assets resides. An associated method is also provided.

25 Claims, 6 Drawing Sheets

US 8,577,934 B2

SYSTEM AND METHOD FOR A STORAGE SYSTEM RESPONSE WITH DATA MIGRATION

CROSS-REFERENCE TO RELATED APPLICATIONS

None.

FIELD OF THE INVENTION

The present invention relates generally to systems and methods for data storage, and more specifically to systems and methods for directing a storage system response, and migration of data.

BACKGROUND

Data storage systems are a staple in digital mass storage for back-up and server applications. More specifically they are commonly used to archive data, i.e., store data that is not immediately needed by a host computer. When a host computer needs the data, a request is sent out to the storage system to retrieve the data.

Within the storage system, data is typically archived on physical long term storage media, such as, for example, tape, magnetic disk, optical disc, solid state memory, etc. . . . . When a request is received for data, the storage system identifies the physical long term storage media containing the specified data and a robot transport mechanism is dispatched to retrieve the long term storage media and provide it to a data transfer interface that is capable of establishing a communication path between the storage media and the requesting host computer.

One example of a storage system is a tape cartridge library. In a tape cartridge library, there are typically a plurality of shelves structured to at least temporarily store a tape cartridge. In some instances, the tape cartridges are themselves stored in movable packs that are themselves temporarily stored on shelf structures. The tape library may have more than one drive (data transfer interface) for reading data from and writing data to the tape media within the tape cartridge. Further, the library may have more than one robot operating within the library to transport tape cartridges between the storage shelves and the read/write drives.

Other variations of storage systems utilizing disks, banks of memory chips or other long term storage media are also available. Regardless of the type of storage system, the technology utilized in a storage system may over time become antiquated as faster elements, e.g. storage elements, robots, readers, control systems, processors, etc. . . . are developed. Accordingly, what was a desirable storage system at one point in time, may become less desirable at a later point in time.

For a variety of different reasons, occurrences, such as, modifications or the replacement of a storage system may arise resulting in time periods where data access is limited. It is to innovations related to this subject matter that the claimed invention is generally directed.

SUMMARY

Embodiments of this invention provide a system and method for data storage, and more specifically to systems and methods for a storage system response and migration of data.

In particular, and by way of example only, according to one embodiment of the present invention, provided is a method for storage system response, including: providing a first storage system that is linked in communication between at least one client and a second storage system, the second storage system having a plurality of digital assets; migrating the digital assets from the second storage system to the first storage system; updating an asset map adapted to keep track of where each of the digital assets is retained; and fulfilling digital asset requests from the at least one client by consulting the asset map to determine the location of the requested digital asset.

In another embodiment, provided is a storage arrangement response adapted to fulfill a method including: receiving a request for a requested digital asset from at least one client; consulting a map that tracks a location for at least a portion of each digital asset, wherein each digital asset is retained in a first storage system, a second storage system, or both of the storage systems; for the received digital asset request, returning at least a portion of the requested digital asset from the first storage system and/or the second storage system after consulting the map; and migrating each digital asset from the second storage system to the first storage system in accordance with an adjustable plan.

In yet another embodiment, provided is a storage system adapted to control migrating assets, including: a first storage system adapted to be linked in communication with at least one client and with a second storage system, the second storage system retaining a plurality of digital assets; an asset map adapted to track where in the first storage system or the second storage system each of the plurality of digital assets are retained; a migrator structured and arranged to migrate each of the plurality of digital assets from the second storage system to the first storage system, the migrator further adapted to update the asset map regarding a status of migration for each of the plurality of digital assets; and a server structured and arranged to fulfill digital asset requests received by the first storage system from the at least one client, the server structured and arranged to consult the asset map to determine where the requested digital assets resides.

BRIEF DESCRIPTION OF THE DRAWINGS

At least one system and method for a storage system response with migration of data will be described, by way of example in the detailed description below with particular reference to the accompanying drawings in which like numerals refer to like elements, and.

DETAILED DESCRIPTION

Before proceeding with the detailed description, it is to be appreciated that the present teaching is by way of example only, not by limitation. The concepts herein are not limited to use or application with a specific of system or method of data storage, or specifically data storage system response with migration of data. Thus, although the instrumentalities described herein are for the convenience of explanation shown and described with respect to exemplary embodiments, it will be understood and appreciated that the principles herein may be applied equally in other types of systems and methods for storage system response and the migration of data.

Figure 1:
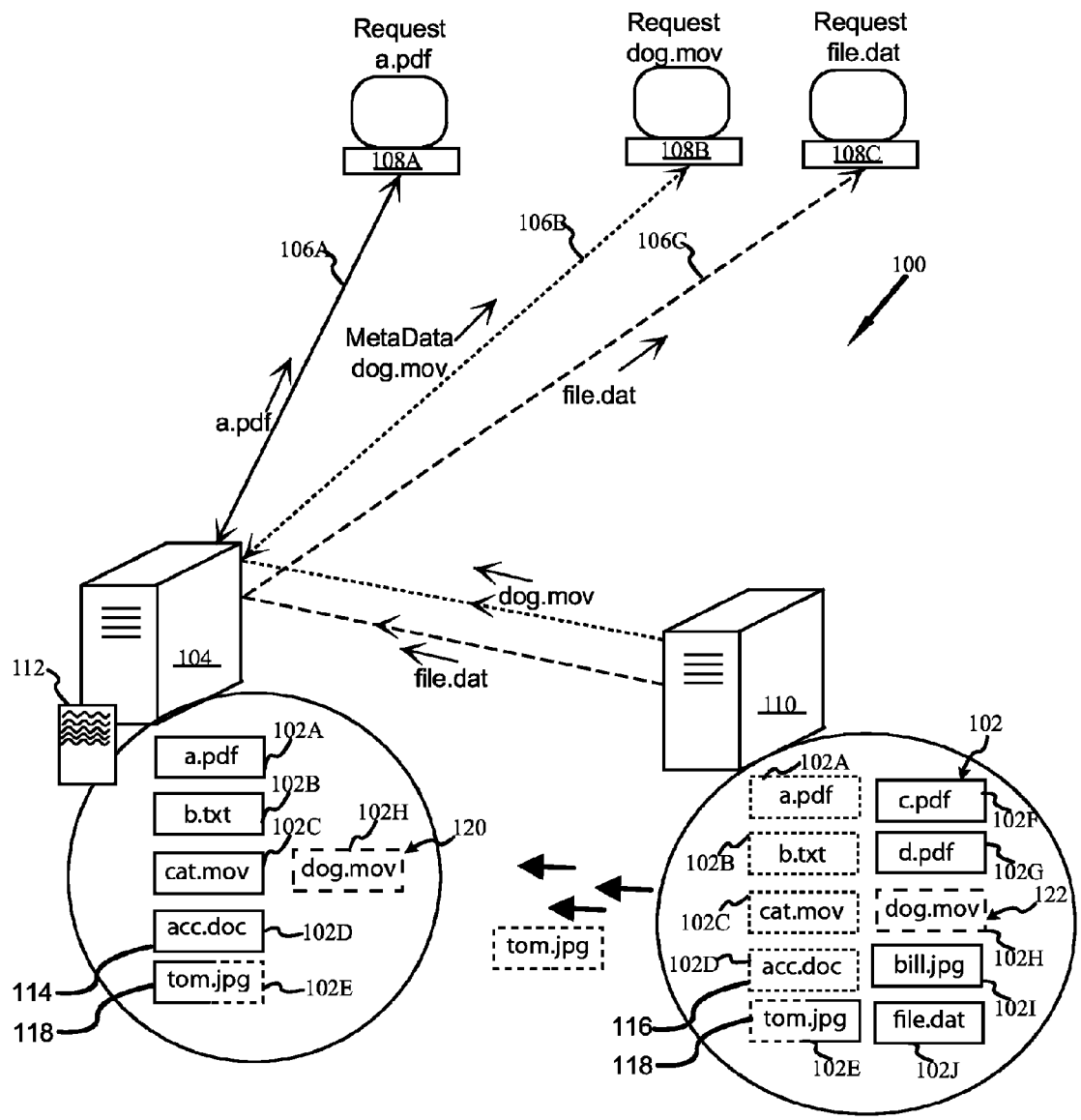
FIG. 1 illustrates a conceptual view of a storage system environment configured to perform migration of digital assets and respond to client request in accordance with certain embodiments of the present invention.

Turning now to the drawings, and more specifically FIG. 1, illustrated is a high-level block diagram of a Storage System Environment 100, hereinafter SSE 100, in accordance with certain embodiments. More specifically, the SSE 100 is adapted to control migrating digital assets 102 of which digital assets 102A~J are exemplary.

As a general overview, SSE 100 comprises a first storage system 104 in a communication link 106A between at least one client 108A and at least one second storage system 110 having a plurality of digital assets 102. The first storage system 104 and the second storage system 110 are further understood and appreciated to be computer systems (including microprocessors, memory and the like) adapted as storage systems. More specifically each may be a general computer system adapted to operate as a storage system, or a specialized storage system that is otherwise controlled by or integrated with a computer system. The first storage system 104 is also understood and appreciated to be distinct from the second storage system 110. Moreover, the first storage 104 system provides a first means for the storing digital assets 102 and the second storage system 110 provides a second means for storing the digital assets 102.

In certain embodiments, the second storage system 110 is a tape library based storage system and the first storage system 104 is a disk based storage system. Moreover, the first storage system 104 and the second storage system 110 employ different forms of storage media (i.e., tapes in the second storage system 110 and hard disk drives in the first storage system 104). In optional embodiments, the first storage system 104 and the second storage system 110 employ essentially the same type of storage media.

Further still, although the first storage system 104 and the second storage system 110 have each been illustrated as a unitary system, it is understood and appreciated that in varying embodiments each may be a singular device providing storage or an organized collection of devices, such as, a networked storage system. Moreover, it is understood and appreciated that in varying embodiments the first storage system 104 and the second storage system 110 may be similar or different in terms such as, but not limited to, their respective types of storage media, storage architecture, and centralized or distributed nature.

As is further shown in FIG. 1, the first storage system 104 has an asset map 112. This asset map 112 tracks the location of each digital asset within the SSE 100, as migration is performed moving each digital asset from the second storage system 110 to the first storage system 104. More specifically, initially all digital assets 102 are present within the second storage system 110. In at least one embodiment, the first storage system 104 is imposed within the SSE 100 so as to take over and/or assume the role of the second storage system 110. Introducing the first storage system 104 in this way may be initiated based on certain criteria or needs to shift the data from the second storage system 110 to the first storage system 104. Such criteria or needs include, for example, reconfiguration or replacement of the second storage system 110.

Digital assets 102A~102D are shown in solid boxes 114 on first storage system 104 to indicate their local presence upon the first storage system 104 and in dotted relief boxes 116 on the second storage system 110 to indicate the source of the digital assets 102A~102D. Digital asset 102E is shown in partial solid and partial dotted box 118 so as to indicate that it is a digital asset 102 in the process of being migrated from the second storage system 110 to the first storage system 104.

In some cases, a digital asset 102 may have a usable first portion and a usable second portion, such as, for example, metadata and core data as in the case of an image file. In at least one embodiment, the metadata component of the digital asset 102 may be migrated independently from the core data of the digital asset 102. In short, the first portion 120 of a digital asset 102 can be migrated before the second portion 122 of the digital asset 102. Digital asset 102H has been illustrated with a dash box so as to visually indicate the metadata 120 present on the first storage system 104 and the core data 122 present on the second storage system 110. The metadata 114 is loosely defined as the data about the core data 116. In other words, the metadata 114 describes the contents and context of the core data 116.

In at least one embodiment, the migration of digital assets 102 from the second storage system 110 to the first storage system 104 is performed in accordance with a user adjustable plan. Moreover, in at least one embodiment the plan for migration can include directives to move the newest assets first, the most used assets first, the largest assets first, the metadata of at least a subset of assets first, and or combinations thereof. Further, in at least one embodiment, the plan for migration may be adjusted so as to adapt to changing or evolving issues as imposed by the clients 108 or within the SSE 100 itself.

As noted above, the asset map 112 is structured and arranged to track the location of each digital asset 102, and portions thereof, such as, metadata 120 and core data 122, within SSE 100. In at least one embodiment, the asset map 112 permits a server element of the first storage system 104 to properly fulfill digital asset requests received by the first storage system 104 from one or more clients, such as exemplary clients 108A~108C. Indeed, in certain embodiments, the process of migration for the digital assets 102 from the second storage system 110 to the first storage system 104 is essentially contemporaneous with fulfilling digital asset requests put forth by the clients 108.

As used herein, the term "fulfilling" as in "fulfilling digital asset requests" is understood and appreciated to encompass and any all acts or actions that satisfy the requesting client. Indeed, in varying instances fulfilling a digital asset request may be accomplished by providing the identified asset back to the requesting client. In other instances fulfilling the digital asset request may be accomplished by providing information, e.g., metadata, about the requested digital asset, such as for example it's creation date, size, author, bit rate, etc. . . . Moreover a "fulfilling" response provided by SSE 100 is one that meets the requirements as put forth by the requesting client 108.

With respect to FIG. 1, it is understood and appreciated that the disposition of the first storage system 104 as between the clients 108 and the second storage system 110 may be logical or physical. For either the logical or physical positioning, the first storage system 104 assumes the identity of the second storage system 110, such that from the perspective of the clients 108 requests for digital assets 102 are handled without interruption via the first storage system 104, as illustratively shown by the arrow paths.

Figure 2:
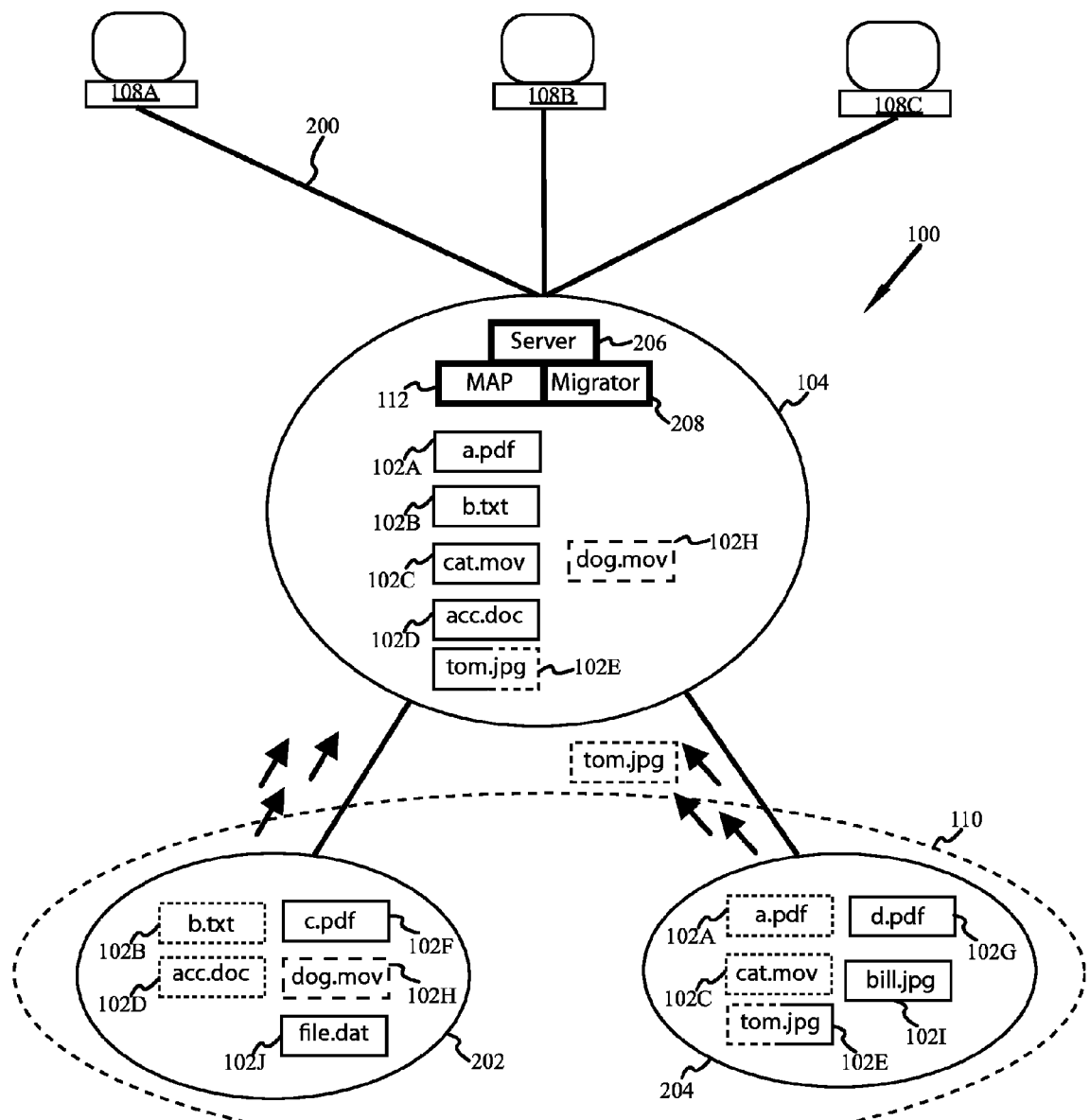
FIG. 2 illustrates a physical placement of a first storage system as between a plurality of clients and a second storage system in accordance with certain embodiments of the present invention.
Figure 3:
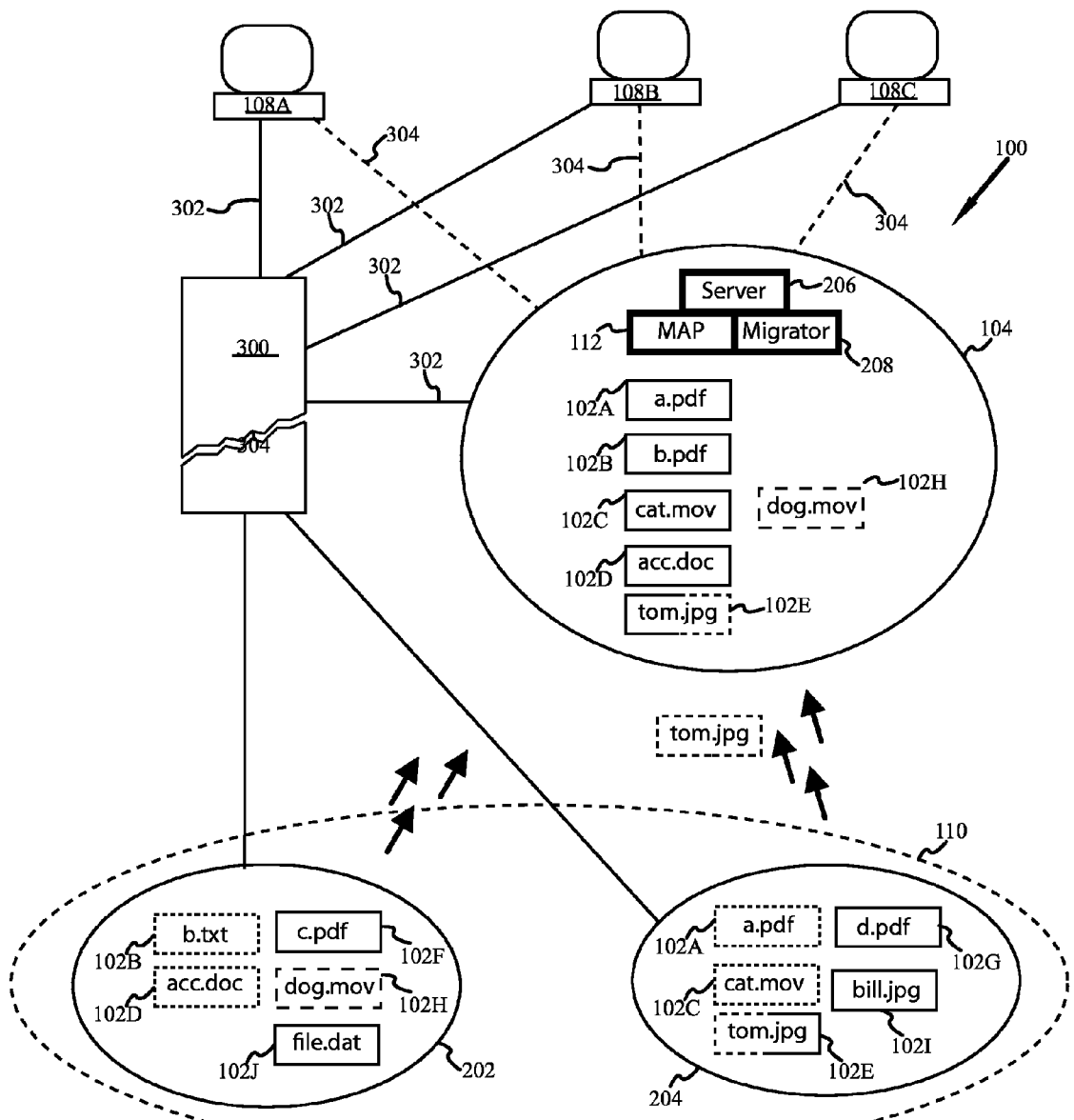
FIG. 3 is a logical placement of a first storage system as between a plurality of clients and a second storage system in accordance with certain embodiments of the present invention.

FIGS. 2 and 3 conceptually illustrate at least two different configurations for SSE 100. More specifically, FIG. 2 conceptually illustrates a physical positioning and FIG. 3 conceptually illustrates a logical positioning.

Turning first to FIG. 2, the first storage system 104 is illustratively shown disposed directly between the client systems 108A~108C and the second storage system 110. Moreover, the first storage system 104 is physically in the actual communication path 200 between the client systems 108A~108C and the second storage system 110. As suggested above, in varying embodiments either or both the first storage system 104 and the second storage system 110 can be distributed storage systems.

In FIG. 2, the second storage system 110 is illustratively shown comprising two separate storage devices, storage device 202 and storage device 204, which collectively are operating as the second storage system 110. The first storage system 104 is also shown to possessing a server 206, the digital asset map 112 and a migrator 208.

In varying embodiments, the server may be a separate computer system in communication with the first storage system 104, or a software or hardware application, which when executed by the processor of the first storage system 104, adapts the first storage system 104 to also operate as a server responding to digital asset requests as received from one or more clients 108. The migrator 208, may likewise be a separate computer system in communication with the first storage system 104, or a software or hardware application, which when executed by the processor of the first storage system 104, adapts the first storage system 104 to also operate as a migrator, migrating the digital assets 102 from the second storage system 110 to the first storage system 104.

As the first storage system 104 has assumed the identity of the second storage system 110, the clients 108 (in certain embodiments) are unaware that the first storage system 104 is now responding to their respective data asset requests.

In the embodiment of FIG. 3, the first storage system 104 is illustratively shown connected to at least one interconnection device, such as a switch or router, hereinafter collectively referred to as switch 300. Likewise the clients 108A~108B and the second storage system 110 are connected to the switch 300. In this embodiment, the first storage system 104 again assumes the identity of the second storage system 110. As such, although the physical connections between the clients 108A~108C and SSE 100 are illustrated by solid lines 302, the perceived connections are as shown by the dotted lines 304.

With respect to the first storage system 104 assuming the identity of second storage system 110 (as shown in the above figures), it is understood and appreciated that such identity assumption may be performed in many ways, such as, but not limited to, a remapping of Internet Protocol addresses (IP addresses) and/or remapping of domain names and/or system names within a domain.

Figure 4:
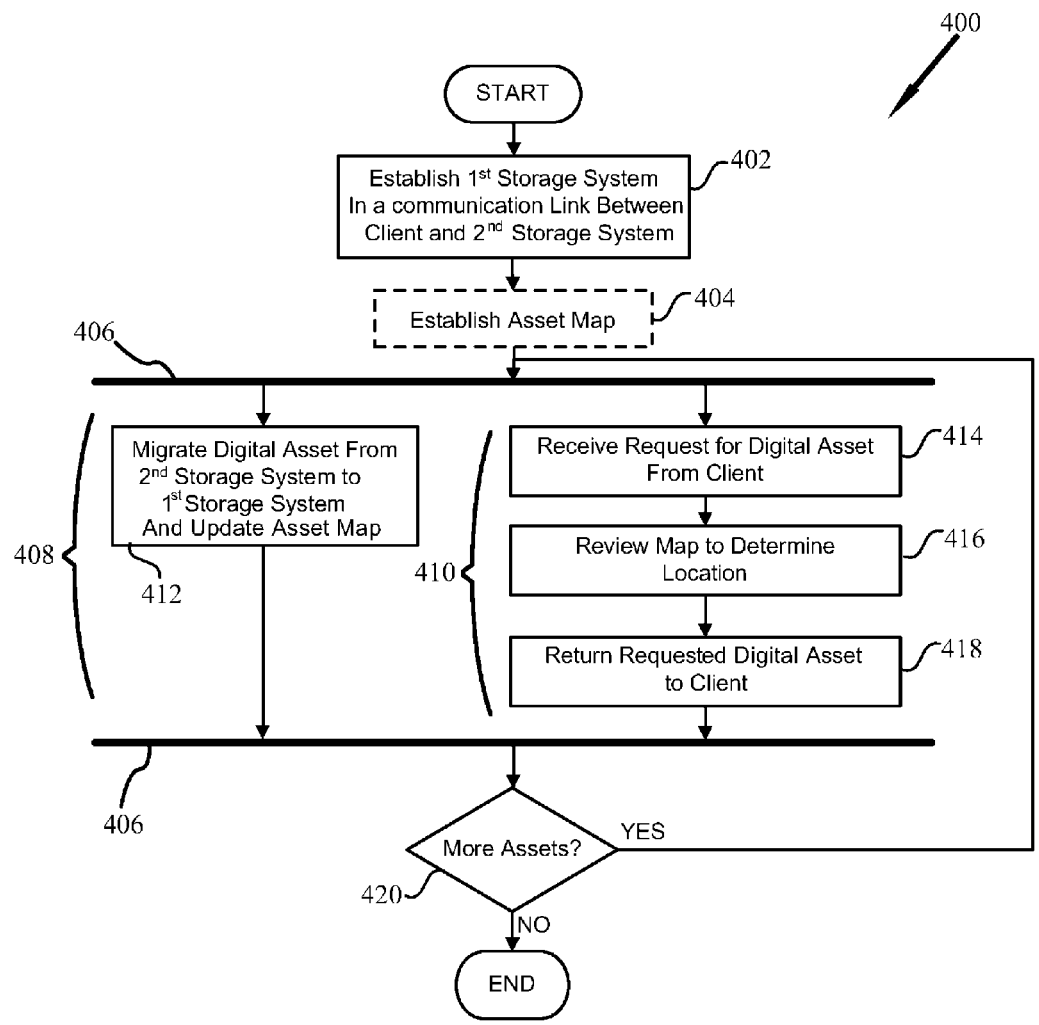
FIG. 4 is a high level flow diagram of a method for a storage system response with migration in accordance with certain embodiments of the present invention.

FIG. 4, in connection with FIGS. 1-3, provides a high level flow diagram with conceptual illustrations depicting at least one method 400 for storage system response and the migration of data, consistent with embodiments of the present invention. It will be appreciated that the described method need not be performed in the order in which it is herein described, but that this description is merely exemplary of one method of storage system response with data migration.

In certain embodiments, the method 400 commences with establishing a first storage system 104 in a communication link between at least one client 108 and at least one second storage system 110 having a plurality of digital assets 102, block 402. It should be understood and appreciated that the first storage system 104 may be a single physical storage system, or a storage system collective, such as, a networked storage system. It should also be appreciated that the first storage system 104 may be a portion of a larger system, the portion adapted to operate as the first storage system 104. Indeed, a larger system may be structured and arranged so as to be adapted to operate as multiple first storage systems 104 for a plurality of different storage system environments, of which SSE 100 as shown and described is exemplary.

In at least one embodiment, the first storage system 104 is imposed within the SSE 100 so as to take over and/or assume the roll of the second storage system 110. Reasons for taking over and/or assuming the role of the second storage system 110, include reconfigurations or replacement of the second storage system 110, just to name two examples.

As noted above, and as shown in FIGS. 1-3, an asset map 112 is utilized by the method 400 to track the location of each asset as between the first storage system 104, the second storage system 110 and/or potentially a combination. In at least one optional embodiment, the asset map 112 is established, optional box 404 (illustratively shown by the dashed box). In yet alternative embodiments, the asset map 112 may be established as part of the migration process 408. Moreover, the asset map 112 may be initialized and or re-verified with each cycle of the migration process 408, and/or may be populated with records to indicate which digital assets 102 have been migrated.

In at least one embodiment, the migration of digital assets 102 from the second storage system 110 to the first storage system 104 is intended to occur essentially concurrently with the serving of digital asset request as initiated by one or more clients 108. Such essentially concurrent behavior is further illustrated by the parallel lines 406.

More specifically, within the parallel lines 406, two distinct processes are further illustrated, one being the migration process 408 and the other being the fulfilling digital asset requests process 410. For the migration process 408, the method 400 is structured and arranged to migrate digital assets 102 from the second storage system 110 to the first storage system 104, block 412. Inherent with the migration process 408, a digital asset map 112 is updated so as to indicate the current location of each digital asset 102.

In varying embodiments, the digital asset map 112 may be initially populated with references to all digital assets 102 contained by the second storage system 110, or established over time as the digital assets 102 are migrated. In the first instance the digital asset map 112 has knowledge of all digital assets within the SSE 100. In the second instance, the digital asset map 112 has knowledge of what digital assets have been migrated, an un-referenced digital asset 102 therefore being by default considered to be present upon the second storage system 110.

With respect to FIGS. 1-3 this migration process 408 is illustrated by digital assets 102A-102D appearing in solid boxes illustratively shown to be in association with the first storage system 104, indicating that they have been migrated. Digital assets 102F, 102G, 102I and 102J are illustrated in solid boxes illustratively shown to be in association with the second storage system 110, indicating that they have yet to be migrated. Digital asset 102E is illustratively shown to be in the active process of migration from the second storage system 110 to the first storage system 104.

In at least one embodiment, occurring essentially contemporaneously with the migration process 408, the digital asset requests process 410 is being fulfilled. The fulfilling digital asset requests process 410 is explained below in more detail with respect to FIG. 1.

First, a request for a digital asset 102 is received by the first storage system 104 from a client 108, block 414. For example client 108A request the file "a.pdf" which is identified as digital asset 102A. A review of the asset map 112 is performed to determine the location of the digital asset 102A, block 416. In certain embodiments, following the migration of digital asset 102A from the second storage system 110 to the first storage system 104, the asset map 112 will indicate the location of digital asset 102A as being located with the first storage system 104.

The requested digital asset 102A is then returned to the client 108A, block 418. In summary, as described in the present embodiment, the digital asset requests received by the first storage system 104 from at least one client 108 are fulfilled by the first storage system 104 consulting the asset map 112 to determine the location of the requested digital asset 102, and then providing the requested digital asset 102.

In certain embodiments, the process of migration may be temporarily halted to dedicated more resources to the task of fulfilling the digital asset request. This temporary halting may be triggered by limited system resources, the priority of the requested digital asset 102 being over a pre-set threshold, the requested digital asset 102 being identified as a priority asset, or other event just to name a few examples.

As indicated by decision 420 this essentially contemporaneous migration and fulfillment of digital asset requests will continue so long as additional digital assets 102 remain on the second storage system 110.

Figure 5:
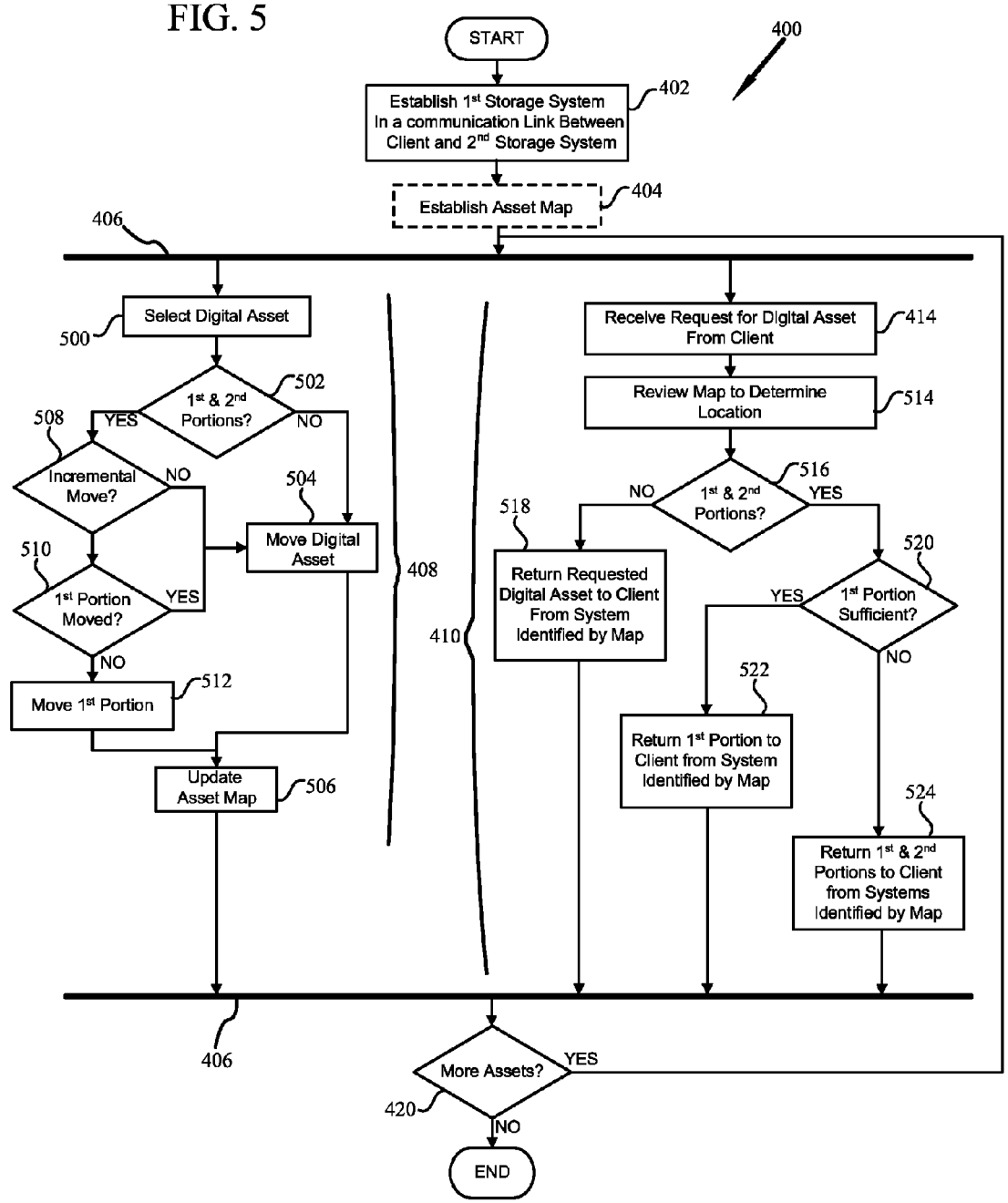
FIG. 5 is a refined flow diagram as shown in FIG. 4 of a method for a storage system response with migration in accordance with certain embodiments of the present invention.

FIG. 5 illustrates method 400 with greater refinement as implemented in certain embodiments. More specifically, certain embodiments of the migration process 408 and the fulfilling digital asset requests process 410 are detailed.

As shown, the migration process 408 commences with the selection of a digital asset 102, block 500. For at least one embodiment, the selection of a digital asset 102 is determined in accordance with a user adjustable plan. Further, in at least one embodiment, the user adjustable plan is selected from a group of options including, but not limited to, newest assets selected first, most used assets selected first, largest assets selected first, metadata of at least a subset of assets selected first and combinations thereof.

Indeed in some instances, at least a subset of digital assets 102 have distinct first and second portions, such as metadata and core data. For example, digital assets such as video files and audio files often have associated metadata providing information such as frame rate, sampling rate, authoring party, NTSC or PAL format, and or other information about the core audio or video data.

It is understood and appreciated that in network transactions, nearly all exchanges and transfers are handled via packet transfers. As such, packet transmission by its nature suggests that digital assets are subdivided and transferred in pieces. However, the issue of distinct first and second portions as described herein is not an issue of packetization, but rather a view of distinct portions of the digital asset that can be identified, used and moved as distinct elements. Moreover the metadata of a digital asset 102 such as an MOV file can be identified and migrated at one point in time with the migration of the core data being performed later after some period of specific and intended delay. In other words, as used herein the identification of distinct first and second portions of a digital asset 102 is not akin to simply first and second packets representing portions of the digital asset during migration transfer, but rather metadata 114 and core data 116 of the digital asset 102D, for example.

For a refined example of method 400, when a digital asset 102 is selected, a determination is further made as to whether the digital asset 102 has a distinct first portion and a second portion, e.g., metadata and core data, decision 502. If the determination is no, the digital asset 102 is migrated from the second storage system 110 to the first storage system, block 504, and the asset map is updated, block 506. With respect to FIGS. 1-3, the digital asset 102B is a text file, and therefore likely not an asset having a distinct first and second portion, so the digital asset 102B has been migrated in its entirety.

If the digital asset 102 does have distinct first and second portions, decision 502, a subsequent decision is made to determine if an incremental move should be performed, decision 508. In the case of a JPG file, although metadata may be present the overall size of the digital asset, e.g., a few megabytes, may be such that it migration of the entire digital asset is not sufficient to trigger an incremental move. In contrast, a video asset may be gigabytes or larger such that migration time may be an issue and an incremental move is determined to be preferable.

Where the decision for an incremental move is no, decision 508, the method proceeds to move the entire digital asset, block 504. Where the decision for an incremental move is yes, block 508, the method proceeds to move the digital asset incrementally. With respect to FIGS. 1-3, digital asset 102H, "dog.mov" is a video asset and has been moved incrementally such that a first portion 120, e.g., metadata, is with the first storage system 104 and a second portion 122, e.g., the core video data, is still with the second storage system 110.

Because the digital asset 102 can be moved incrementally, the method 400 proceeds to determine the state of migration. If the first portion has not been moved, decision 510, the method proceeds to move the first portion, e.g., metadata, from the second storage system 110 to the first storage system, block 512. The asset map 112 is then updated to indicate the first portion as present upon the first storage system 104 and the second portion as present upon the second storage system 110, block 506.

If the first portion has been previously moved, decision 510, the method proceeds to move the core portion of the asset, block 504. The asset map 112 is then updated to indicate that all portions of the digital asset 102 are present upon the first storage system 104, block 506.

It is further understood and appreciated that the migration process 408 is intended to be transparent to the clients 108. In other words from the perspective of each client 108, requested digital assets 102 are simply available as they have always been and the clients 108 are not required to know anything about the migration process 408. Also, in varying embodiments authentication and/or encryption methods are employed to ensure and safeguard the migration process 408.

In FIG. 5, the fulfilling digital asset requests process 410 is illustratively shown to involve refined use of the asset map, block 514. Specifically, a query is made to determine if the requested digital asset 102 has first and second portions, decision 516.

Where the decision 516 returns no, the requested digital asset 102 does not have first and second portions, the asset map 112 is consulted to determine the location of the digital asset 102, and the digital asset is then returned to the client 108, block 518. Where the asset map 112 indicates that the requested digital asset 102 is present upon the first storage system 104, the digital asset 102 is provided from the first storage system 104 directly back to the requesting client 108.

However, when the asset map 112 indicates that the requested digital asset 102 has not been migrated and is therefore still on the second storage system 110 at least two options may occur.

In at least one embodiment, the requested digital asset 102 is migrated from the second storage system 110 to the first storage system 104 and contemporaneously forwarded back to the requesting client 108 by the first storage system 104. Such duality of operation fulfills both the migration process 408 as well as the request from the client 108.

It is to be appreciated that some network morphology conditions may exist or arise which make migration to the first storage system 104 less desirable when before, or as part of, the request fulfillment. For example, if the requesting client 108 and the second storage system 110 are within the same general network, e.g., Abovenet, Uunet, Level3, etc. . . . and the first storage system 104 is in a different general network, in some instances it may be preferred for the first storage system 104 to direct the second storage system 110 to respond directly to the requesting client 108. Such instances may include, but are not limited to instances of heavy cross network congestion, the failure of a switch, the severing of a primary communication link between networks, or other events.

Returning to the query of whether the requested digital asset 102 has first and second portion, decision 516, where the decision 516 returns in the affirmative as to the first and second parts of the digital asset 102, a further query is made to determine if the first portion of the requested digital asset 102 will be sufficient to fulfill the asset request, decision 520.

If the first portion is sufficient, the method 400 proceeds to review the asset map 112 to determine the location of the first portion and then return the first portion to the requesting client, block 522. As above, where the first portion 120 is indicated by the asset map 112 to be present upon the first storage system 104, the first portion 120 is returned directly from the first storage system 104. As shown in FIG. 1, the first portion 120 of the digital asset 102H is on first storage system 104 and may therefore be provided by the first storage system 104 to requesting client 108B.

Where the asset map 112 indicates that the first portion 120 has not yet been migrated, in varying embodiments the first portion may be migrated and returned to the requesting client 108 by the first storage system 104, or returned directly by the second storage system 110.

If the first portion 120 of the requested digital asset 102 is not sufficient, the method 400 proceeds to review the asset map 112 to determine the location of the both the first and second portions of the requested digital asset 102. Moreover the asset map 112 may indicate that the digital asset 102 has been entirely migrated (e.g., it is entirely present upon the first storage system 104), that the digital asset 102 has been partially migrated (e.g., the first portion is upon the first storage system 104 and the second portion is upon the second storage system 110), or that the digital asset 102 has not yet been migrated (e.g., it is entirely present upon the second storage system 110).

As both the first and second portions are desired to fulfill the digital asset request, both portions are returned to the client 108 from the locations as identified by the asset map 112. Again, in varying embodiments, the process of return may further involve the concurrent migration of the requested digital asset 102 from the second storage system 110 to the first storage system 104, such that the first storage system 104 also returns the requested digital asset directly. Alternatively, the first storage system 104 may direct the second storage system 110 to respond with the second and/or first portion of the digital asset 102.

Figure 6:
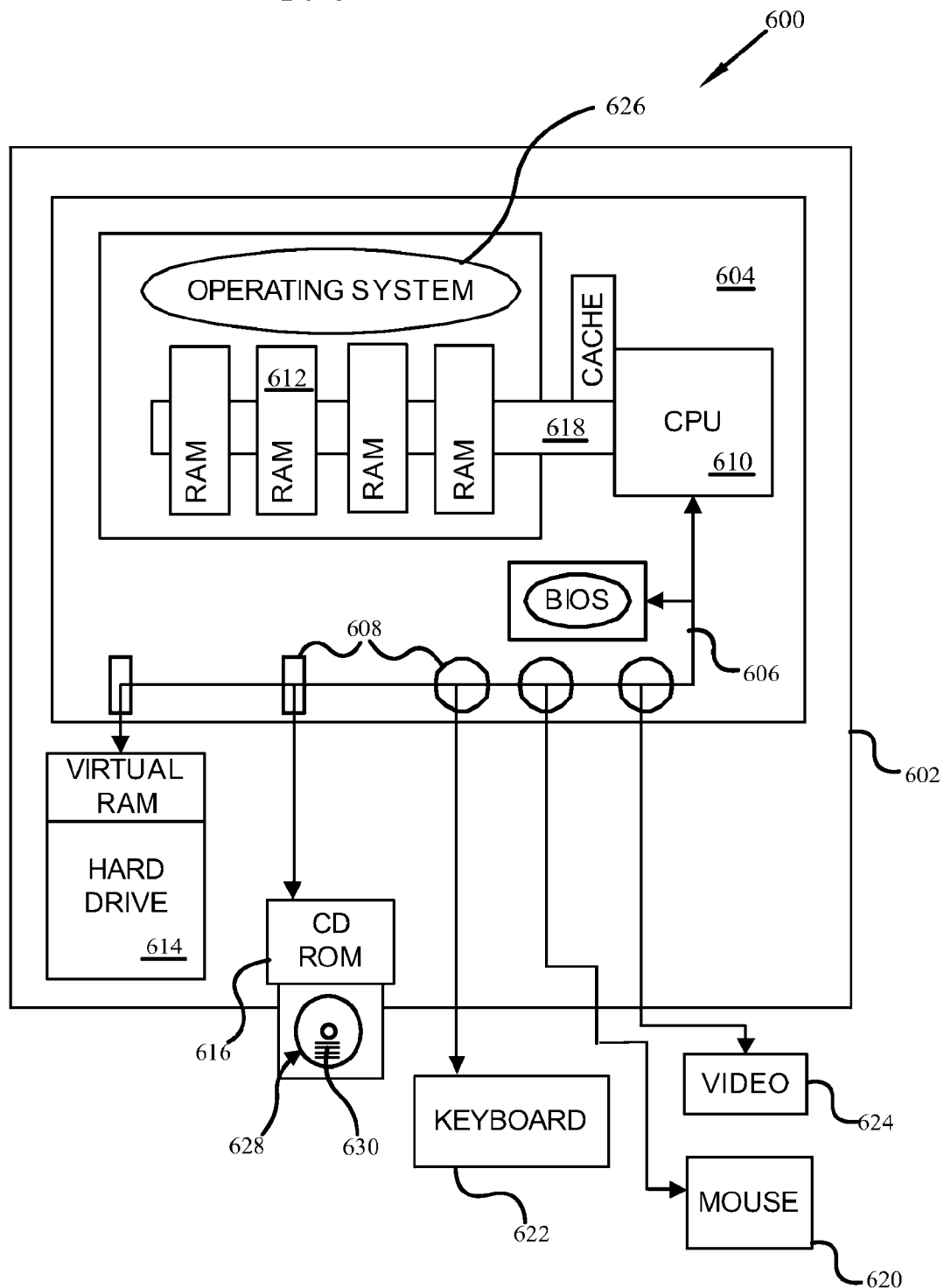
FIG. 6 is a block diagram of a computer system in accordance with certain embodiments of the present invention.

With respect to the above description of SSE 100 and method 400 it is understood and appreciated that the method may be rendered in a variety of different forms of code and instruction as may be used for different computer systems and environments. To expand upon the initial suggestion of a computer implementation above, FIG. 6 is a high level block diagram of an exemplary computer system 600. Computer system 600 has a case 602, enclosing a main board 604. The main board 604 has a system bus 606, connection ports 608, a processing unit, such as Central Processing Unit (CPU) 610 with at least one macroprocessor (not shown) and a memory storage device, such as main memory 612, hard drive 614 and CD/DVD ROM drive 616.

Memory bus 618 couples main memory 612 to the CPU 610. A system bus 606 couples the hard disc drive 614, CD/DVD ROM drive 616 and connection ports 608 to the CPU 610. Multiple input devices may be provided, such as, for example, a mouse 620 and keyboard 622. Multiple output devices may also be provided, such as, for example, a video monitor 624 and a printer (not shown).

Computer system 600 may be a commercially available system, such as a desktop workstation unit provided by IBM, Dell Computers, Gateway, Apple, or other computer system provider. Computer system 600 may also be a networked computer system, wherein memory storage components such as hard drive 614, additional CPUs 610 and output devices such as printers are provided by physically separate computer systems commonly connected together in the network. Those skilled in the art will understand and appreciate that the physical composition of components and component interconnections are comprised by the computer system 600, and select a computer system 600 suitable for the establishing first storage system 104.

When computer system 600 is activated, preferably an operating system 626 will load into main memory 612 as part of the boot strap startup sequence and ready the computer system 600 for operation. At the simplest level, and in the most general sense, the tasks of an operating system fall into specific categories, such as, process management, device management (including application and user interface management) and memory management, for example.

Where such a computer system 600 is adapted as the second storage system 110, or as part of the second storage system 110, the CPU 610 is operable to perform and respond to migration and/or asset request as described above. Where such a computer system 600 is adapted as the first storage system 104, or as part of the first storage system 104, the CPU 610 is operable to perform one or more of the methods of migration and asset request fulfillment as described above.

The form of the computer-readable medium 628 and language of the program 630 are understood to be appropriate for and functionally cooperate with the computer system 600. In at least one embodiment, the computer system 600 adapted as the first storage system 104 is a SpectraLogic nTier 700, manufactured by Spectra Logic Corp., of Boulder Colo.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A storage system environment comprising:
    a host possessing an established storage relationship with a second storage system wherein a plurality of digital assets are retained by said second storage system for said host, said plurality of digital assets comprising a first digital asset that possesses a first digital asset portion and a second digital asset portion;
    after a first storage system is connectively interposed between said second storage system and said host, said first digital asset portion is transferred from said second storage system to said first storage system and retained by said first storage system;
    said first digital asset portion transferred to said host from said first storage system and said second digital asset portion transferred to said host from said second storage system via said first storage system in response to a request by said host to receive said first digital asset, said host does not have knowledge that said first digital asset portion is from said first storage system and said second digital asset portion is from said second storage system.

2. The storage system environment of claim 1 wherein said host has no knowledge of said first storage system.

3. The storage system environment of claim 1 wherein said first storage system is connectively interposed between said second storage system and said host in order to transfer said plurality of digital assets from said second storage system to said first storage system.

4. The storage system environment of claim 3 wherein said first storage system will replace said second storage system and said second storage system disconnected from said storage system environment after said plurality of digital assets are transferred to said first storage system.

5. The storage system environment of claim 3 further comprising an asset map that maps where each of said plurality of digital assets, or parts of digital assets are located while being transferred in one direction, said one direction from said second storage system to said first storage system.

6. The storage system environment of claim 3 further comprising a migrator that migrates all of said plurality of digital assets from said second storage system to said first storage system.

7. The storage system environment of claim 6 where said migrator updates an asset map, said asset map maps where each of said plurality of digital assets, or parts of digital assets are located while all of said digital assets are being transferred from said second storage system to said first storage system.

8. The storage system environment of claim 1 wherein a second digital asset retained in said second storage system is transferred to said host via said first storage system following a new request by said host for said second digital asset.

9. The storage system environment of claim 1 wherein a second plurality of digital assets is not transferred to said first storage system from said second storage system.

10. The storage system environment of claim 1 wherein said second storage system possesses an identity and said first storage system assumes said identity.

11. The storage system environment of claim 1 wherein said second storage system is a tape library.

12. A method comprising:
    providing a second storage system that is communicatively connected to a host, a first digital asset and a second digital asset retained by said second storage system, said first digital asset comprising a first portion and a second portion;
    connecting a first storage system to said host and said second storage system, wherein said second storage system becomes connected to said host only by way of said first storage system;
    migrating said first portion of said first digital asset from said second storage system to said first storage system;
    after migrating said first portion, receiving a first request from said host to transfer said first digital asset to said host;
    based on said request, transferring said first portion of said first digital asset from said first storage system and said second portion of said first digital asset from said second storage system to said host wherein said host has no knowledge of said first and said second portions of said first digital asset.

13. The method of claim 12 wherein said first digital asset is a file and said first portion is meta data of said file and said second portion is core data of said file.

14. The method of claim 12 further comprising migrating said second portion of said first digital asset to said first storage system from said second storage system essentially contemporaneously when being transferred to said host; combining said first portion and said second portion to recreate said first digital asset wherein after said first digital asset is retained in said first storage system.

15. The method of claim 12 further comprising migrating said first digital asset before said second digital asset because said first digital asset has higher priority.

16. The method of claim 15 wherein higher priority is determined via a user adjustable plan which is selected from a group consisting of: newest assets first, most used assets first, largest assets first, metadata of at least a subset of assets first, and combinations thereof.

17. The method of claim 12 wherein said second digital asset possesses two portions, migrating one of said two portions before migrating said second portion of said first digital asset.

18. The method of claim 17 wherein said portions of said digital assets are mapped using an asset map provided by said first storage system.

19. The method of claim 12 wherein said second storage system possesses an identity that is used by said host to identify said second storage system, said first storage system assumes said identity after said connecting.

20. A method comprising:
    providing a second storage system that is communicatively connected to a host wherein said second storage system is identified by said host as storage system A, a plurality of digital asset retained by said second storage system;
    connecting a first storage system to said host and said second storage system, wherein said second storage system becomes connected to said host through said first storage system, said first storage system and said second storage system are seen by said host as said storage system A;
    migrating said plurality of digital asset from said second storage system to said first storage system;
    receiving a first request from said host to transfer said first digital asset from said storage system A to said host while said migration is in progress;
    based on said request, transferring said first digital asset to said host regardless of whether said first digital asset is located in a) said first storage system, b) said second storage system, or c) partially in said first storage system and partially in said second storage system.

21. The method of claim 20 wherein based on said request, transferring said first digital asset to said host under the circumstance when said first digital asset is partially in said first storage system and partially in said second storage system, said host has no knowledge that said first digital asset is partially in said first storage system and partially in said second storage system.

22. The method of claim 21 wherein said first digital asset that is partially in said second storage system is migrated to said first storage system during said transferring step to said host.

23. The method of claim 20 further comprising disconnecting said second storage system from said first storage system and from said host after all of said digital assets are transferred from said second storage system to said first storage system.

24. The method of claim 20 further comprising maintaining a map of where each of said plurality of digital assets are located and where any portions of said plurality of digital assets are located during said migration.

25. The method of claim 20 wherein at least a subset of said plurality of digital assets comprise core data and meta data, and during said migrating step said meta data is migrated from said second storage system to said first storage system before sending any of said core data.

* * * * *